No. 791,162. PATENTED MAY 30, 1905.
W. L. PAUL.
PLANTER.
APPLICATION FILED NOV. 17, 1903.
3 SHEETS—SHEET 1.
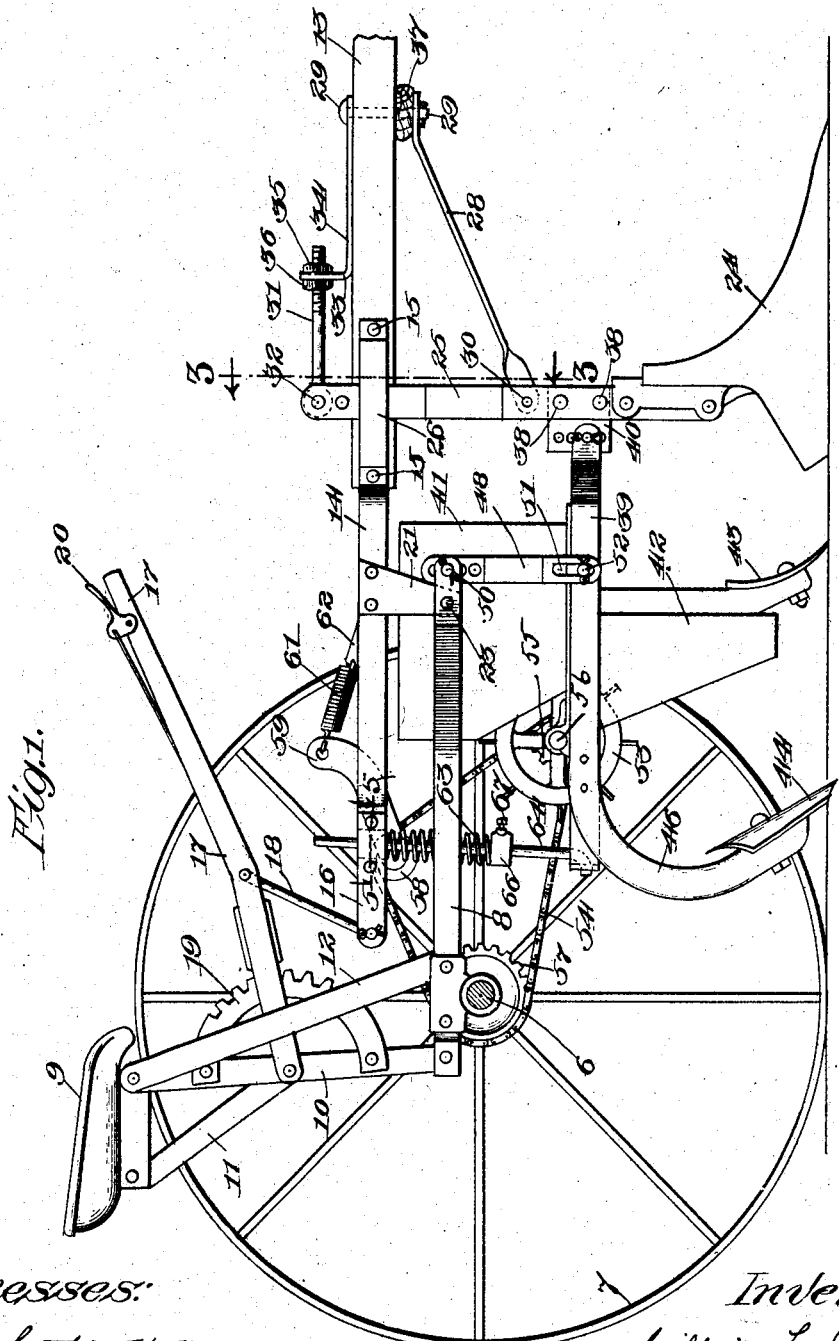

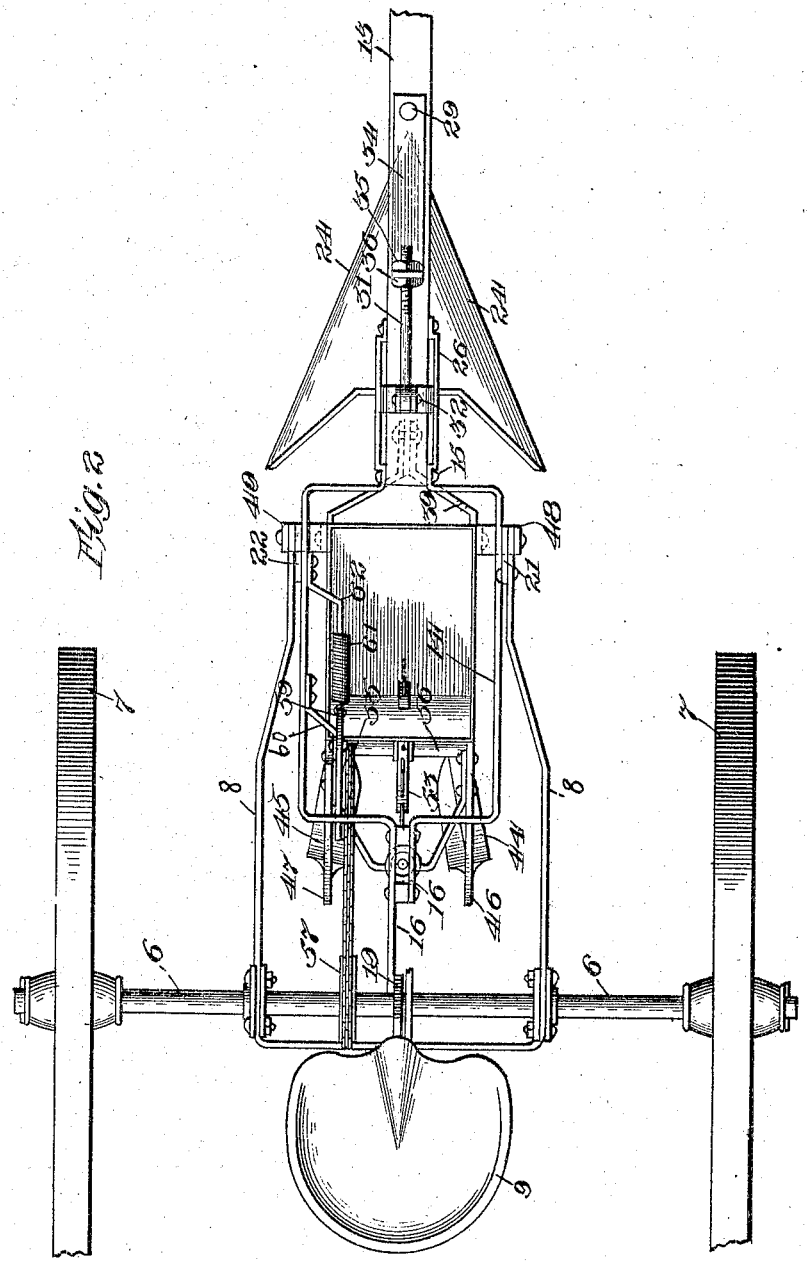

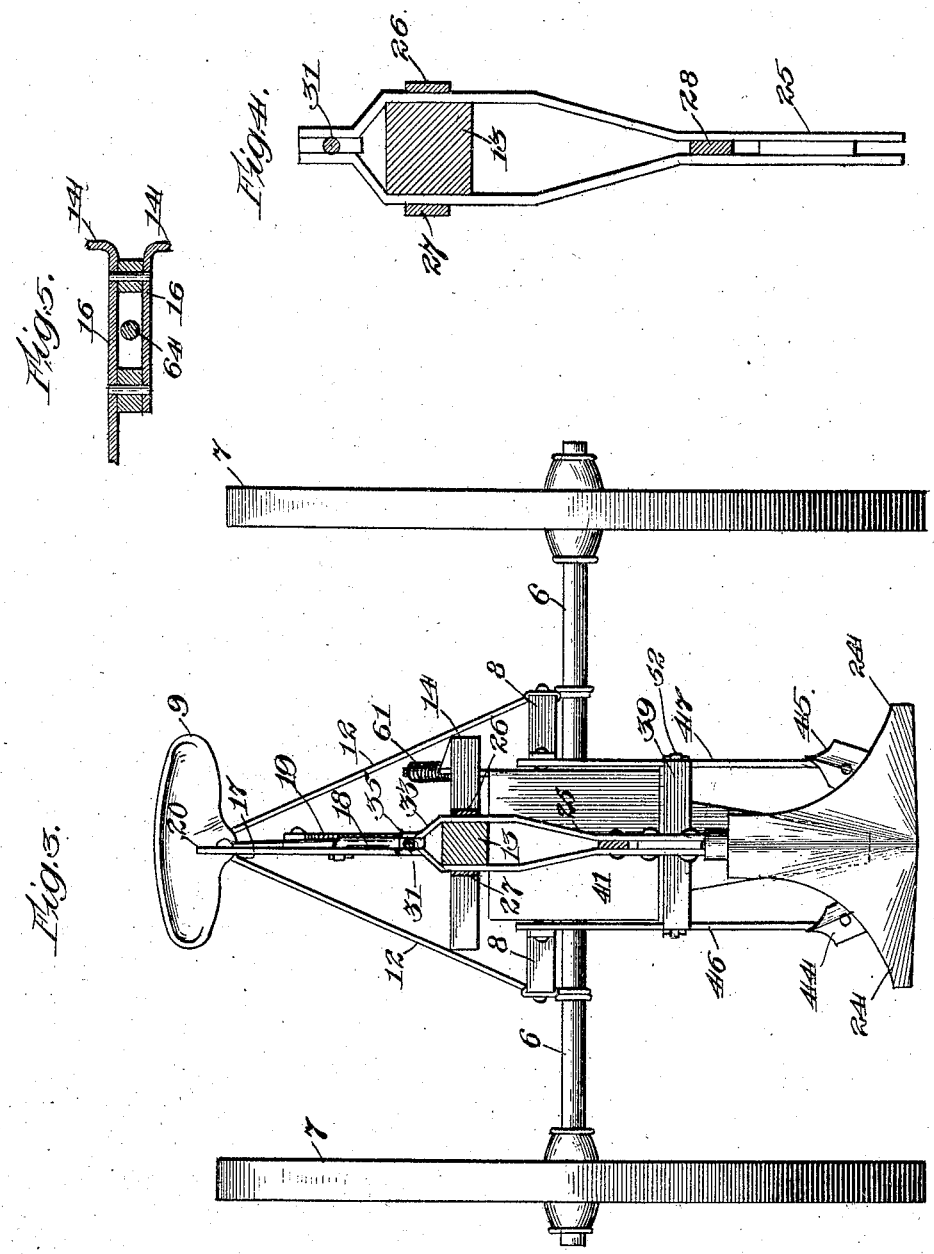

No. 791,162. Patented May 30, 1905.

UNITED STATES PATENT OFFICE.

WILLIAM L. PAUL, OF BRADLEY, ILLINOIS, ASSIGNOR TO DAVID BRADLEY MANUFACTURING COMPANY, OF CHICAGO, ILLINOIS, AND BRADLEY, ILLINOIS, A CORPORATION OF ILLINOIS.

PLANTER.

SPECIFICATION forming part of Letters Patent No. 791,162, dated May 30, 1905.

Application filed November 17, 1903. Serial No. 181,565.

*To all whom it may concern:*

Be it known that I, WILLIAM L. PAUL, a citizen of the United States, residing at Bradley, in the county of Kankakee and State of Illinois, have invented certain new and useful Improvements in Planters, of which the following is a specification, reference being had to the accompanying drawings.

My invention relates to planters, and has for its object to provide a new and improved planter of the general type illustrated and described in my pending application, Serial No. 128,365, filed October 22, 1902, adapted for the planting of cotton, corn, and other seed. I accomplish this object as illustrated in the drawings and as hereinafter described.

What I regard as new is set forth in the claims.

In the accompanying drawings, Figure 1 is a side elevation, one wheel being removed. Fig. 2 is a plan view. Fig. 3 is a vertical section on line 3 3 of Fig. 1. Fig. 4 is an enlarged detail of certain parts shown in Fig. 3, and Fig. 5 is a section on line 5 5 of Fig. 1.

Generally speaking, my improved planter consists of a wheel-frame which carries the seat and extends a considerable distance forward from the wheel-spindles, a tongue connected with the forward portion of said wheel-frame through a rearward extension of the tongue, a lifting-lever supported by the wheel-frame and connected with said rearward extension of the tongue for vertically adjusting the seeding and furrow-opening devices, a vertically-swinging frame which carries the seeding devices and for convenience will be termed the "seeding-frame," mechanism actuated by the progressive motion of the machine for operating the seed-dropping mechanism, a sweep for opening the furrow, and covering devices back of the seeding devices. The seeding-frame is pivotally connected at its front end to the sweep-standard, the draft being transmitted to said frame from the draft devices through said standard. In order that the weight of the seeding-frame when in operation may rest on the ground, it is unsupported by the carriage. Provision is made, however, for raising said frame to inoperative position by providing a connection between said frame and the wheel-frame, so that when the forward portion of the wheel-frame is raised beyond a certain point the seeding-frame is also raised. When in operative position, however, it is free to rise and fall independently of the carriage. It will be understood that by the term "carriage" I refer to the wheel-frame and the parts through which it is connected with the draft devices. In order to further press the shovels in the ground, I provide suitable spring mechanism which exerts a downward pressure upon the seeding-frame.

Referring now to the drawings for a detailed description of my improved machine, as illustrated in the accompanying drawings, 6 indicates the axle, and 7 the wheels. 8 indicates the wheel-frame, which, as shown in Figs. 1 and 2, is mounted near its rear end upon the axle 6, so that the greater part of said frame lies forward thereof. 9 indicates the seat, which is mounted on a suitable support 10, which rises from the wheel-frame 8, back of the axle, as shown in Fig. 1. 11 12 indicate braces for the support 10. By this construction the weight of the driver lies back of the axle and serves to counterbalance to a greater or less extent the front part of the wheel-frame and other parts supported thereby.

13 indicates the tongue, and 14 the rearward extension thereof, which, as shown in Fig. 1, extends back to a point near the axle. The extension 14 of the tongue is rigidly connected with the rear end of the tongue by bolts 15. The extension 14 of the tongue is in the form of a rectangular frame, as illustrated in Fig. 2, this construction being employed instead of extending the tongue itself directly back in order not to interfere with the rise and fall of the seedbox hereinafter described.

16 indicates a projection at the rear of the extension-frame 14.

17 indicates a lifting-lever, pivoted upon the support 10 and connected by a link 18 with the projection 16 of the extension-frame 14. The lever 17 is provided with a locking-dog, operated by the usual hand-lever 20, which dog engages a segmental rack 19, as shown in Fig. 1, so that said lever 17 may be locked in its different positions of adjustment.

As best shown in Fig. 1, the wheel-frame 8 is connected with the extension 14 by arms 21 22 at opposite sides thereof, said arms being connected to the side pieces of the wheel-frame 8, near the forward ends thereof, by pivots 23. (Shown in Fig. 1.) By this construction by operating the lever 17 the forward portion of the wheel-frame 8 may be raised or lowered at pleasure.

24 indicates a sweep carried at the lower end of a standard 25, the upper end of which is bifurcated and embraces the rear end of the tongue, as best shown in Fig. 4.

26 27 indicate the forward ends of the frame 14, which are secured at the sides of the tongue over the members of the standard 25 for guiding the standard as it moves back and forth beside the tongue, as best shown in Fig. 4.

28 indicates a brace, connected at its forward end to the tongue by a bolt 29 and at its rear end connected to the standard 25 by a pivot 30, so that the standard is adapted to rock upon said pivot.

31 indicates a bolt, hinged at 32 to the upper end of the standard 25 and at its forward end passing through a lip 33, carried by a plate 34, secured upon the tongue. (Best shown in Fig. 1.) Nuts 35 36 are provided at opposite sides of the lip for securing the bolt 31 in different positions of adjustment. By adjusting said nuts upon the bolt 31 the standard 25 may be rocked upon the pivot 30, changing the angular position of the sweep 24. 37 indicates the draft devices, which, as shown in Fig. 1, are mounted on the bolt 29.

39 indicates the seeding-frame, which, as shown in Fig. 1, is pivoted at its forward end to a clevis-plate 40, carried at the rear of the sweep-standard 25 and secured thereto by rivets 38. The seeding-frame carries the seedbox 41, seed-tube 42, shovel-standard, and shovel 43. It also carries at the rear two covering-shovels 44 45, mounted on standards 46 47, respectively, provided at the sides of the seeding-frame. (Best shown in Figs. 2 and 3.)

48 49 indicate straps at the opposite sides of the seeding-frame, which straps are connected at their upper ends by pins 50 to the forward ends of the side members of the wheel-frame 8, the pins 50, as shown in Fig. 1, lying forward of the pivots 23, by which the arms 21 are connected to the wheel-frame. The straps 48 49 are provided with a plurality of holes at their upper ends, so that they may be vertically adjusted. Each of said straps is provided at its lower end with a slot 51, extending longitudinally thereof and adapted to receive a pin 52, projecting from the seeding-frame, as shown in Fig. 1. Said slots are long enough to permit the seeding-frame to rise and fall freely when in operative position. By raising the forward end of the wheel-frame, however, beyond a certain point the straps 48 49 engage the pins 52 and raise the seeding-frame.

53 indicates a wheel which controls the dropping of the seed from the seedbox 41. Said wheel is rotated by means of a link belt 54, which runs over a sprocket-wheel 55, mounted on a shaft 56 of the wheel 53, and over a sprocket-wheel 57, mounted on the axle 6, as shown in Fig. 1. The link belt 54 also passes over a tightener-pulley 58, mounted on a swinging arm 59, pivoted to a bracket 60, secured to the extension-frame 14, as shown in Fig. 2. A spring 61, connected to the forward end of the arm 59 and to the extension 14 by means of a link 62, serves to hold the link belt 54 tight at all times.

The rear end of the seeding-frame is held down to hold the different shovels in proper operative position by means of a spring 63, which is mounted on a rod 64, connected at its lower end to the rear portion of the seeding-frame 39 and passing at its upper end between the members of the projection 16 of the extension 14, as best shown in Figs. 1 and 5. The upper end of the spring 63 bears against the under side of the projection 16, while the lower end of said spring bears upon an adjustable block 66, mounted on the rod 64 and held in position by a set-screw 67. By this construction the downward pressure upon the rear portion of the seeding-frame may be adjusted at pleasure, or the spring 63 can be rendered inoperative, if desired, the weight of the seeding-frame and parts carried thereby alone being used to press the shovels into the ground. The spring is provided for use in hard ground, where extra pressure is required.

In operation as the machine progresses a furrow is opened by the sweep 24, the shovels carried by the seeding-frame running in the furrow formed by said sweep and being pressed down into the ground by the weight of the seedbox and seeding-frame and by the spring 63. The seeding-frame, however, is not held down positively by connection with other parts of the machine, but is free to rise and fall at all times while in operation. The rear portion of the tongue rests upon the forward portion of the wheel-frame, by which it is supported, the weight of the tongue being counterbalanced by the weight of the driver. When desired, the seeding-frame may be raised, so as to hang suspended from the forward portion of the wheel-frame, by operating the lever 17 to raise the forward portion of the wheel-frame high enough to cause the straps 48 49 to engage the pin 52 and lift the furrow-openers off the ground. The tension device for the link belt, by which the seeding devices are operated, maintains the proper tension at all times on said belt regardless of the position of the seeding-frame with regard to the wheel-frame.

Having thus described in detail the construction illustrated in the accompanying drawings, I wish it to be understood that my invention is not restricted to the specific details of the construction described except in so far as they are particularly claimed.

That which I claim as my invention, and desire to secure by Letters Patent, is—

1. A planter, comprising a wheel-frame having a portion extending forward of the wheel-spindles, a tongue pivotally connected at the rear with the forward portion of said wheel-frame, a seeding-frame vertically movable independently of said tongue, and seeding devices carried by said seeding-frame, substantially as described.

2. A planter, comprising a wheel-frame having a portion extending forward of the wheel-spindles, a tongue pivotally connected at the rear with the forward portion of said wheel-frame, a seeding-frame vertically movable independently of said wheel-frame, and seeding devices carried by said seeding-frame, substantially as described.

3. A planter, comprising a wheel-frame having a portion extending forward of the wheel-spindles, a tongue pivotally connected at the rear with the forward portion of said wheel-frame, an independently-swinging seeding-frame adapted to swing about a substantially horizontal axis, and seeding devices carried by said seeding-frame, substantially as described.

4. A planter, comprising a wheel-frame having a portion extending forward of the wheel-spindles, a tongue pivotally connected at the rear with the forward portion of said wheel-frame, an independently-swinging seeding-frame adapted to swing about a substantially horizontal axis, seeding devices carried by said seeding-frame, and means for raising said seeding-frame to an inoperative position, substantially as described.

5. A planter, comprising a wheel-frame, a tongue pivotally connected with said wheel-frame, a sweep-standard, a sweep carried thereby, a seeding-frame connected at its forward end to said sweep-standard, and seeding devices carried by said seeding-frame, substantially as described.

6. A planter, comprising a wheel-frame, a tongue pivotally connected with said wheel-frame, a sweep-standard, a sweep carried thereby, a seeding-frame pivotally connected at its forward end to said sweep-standard, and seeding devices carried by said seeding-frame, substantially as described.

7. A planter, comprising a wheel-frame, a tongue pivotally connected with said wheel-frame, a sweep-standard, a sweep carried thereby, a seeding-frame pivotally connected at its forward end with said sweep-standard, seeding devices carried by said seeding-frame, and means for raising said seeding-frame to an inoperative position, substantially as described.

8. A planter, comprising a wheel-frame, a tongue pivotally connected with said wheel-frame, a sweep-standard adjustably connected with said tongue, a sweep carried thereby, a seeding-frame connected at its forward end to said sweep-standard, and seeding devices carried by said seeding-frame, substantially as described.

9. A planter, comprising a wheel-frame, a tongue pivotally connected with said wheel-frame, a sweep-standard adjustably connected with said tongue, a sweep carried thereby, a seeding-frame pivotally connected at its forward end to said sweep-standard, and seeding devices carried by said seeding-frame, substantially as described.

10. A planter, comprising a wheel-frame, a tongue pivotally connected therewith, a sweep-standard connected with the tongue, a sweep carried thereby, a seeding-frame pivotally connected with said sweep, said seeding-frame being arranged so that its entire weight rests upon the ground when in operative position, and seeding devices carried by said seeding-frame, substantially as described.

11. A planter, comprising a wheel-frame having a portion extending forward of the wheel-spindles, a tongue pivotally connected at the rear with the forward portion of said wheel-frame, a seeding-frame arranged so that its weight rests wholly on the ground when it is in operative position, and seeding devices carried by said seeding-frame, substantially as described.

12. A planter, comprising a wheel-frame having a portion extending forward of the wheel-spindles, a tongue pivotally connected at the rear with the forward portion of said wheel-frame, a seeding-frame connected with the forward portion of said wheel-frame and movable vertically independently thereof, and seeding devices carried by said seeding-frame, substantially as described.

13. A planter, comprising a wheel-frame having a portion extending forward of the wheel-spindles, a tongue pivotally connected at the rear with the forward portion of said wheel-frame, a seeding-frame connected with the forward portion of said wheel-frame and movable vertically independently thereof, seeding devices carried by said seeding-frame, and lifting mechanism for raising said seeding-frame to an inoperative position, substantially as described.

14. A planter, comprising a wheel-frame having a portion extending forward of the wheel-spindles, a tongue pivotally connected at the rear with the forward portion of said wheel-frame, a seeding-frame connected with the forward portion of said wheel-frame and movable vertically independently thereof, seeding devices carried by said seeding-frame, and lifting mechanism mounted on the wheel-frame for raising said seeding-frame to an inoperative position, substantially as described.

15. A planter, comprising a wheel-frame having a portion extending forward of the wheel-spindles, a tongue pivotally connected with the forward portion of the wheel-frame, a seeding-frame pivotally connected at its forward end with the tongue and movable vertically independently thereof, and seeding devices carried by said seeding-frame, substantially as described.

16. A planter, comprising a wheel-frame having a portion extending forward of the wheel-spindles, a tongue having a rearward extension pivotally connected with the forward portion of the wheel-frame, a seeding-frame connected with said tongue and with the forward portion of the wheel-frame, and seeding devices carried by said seeding-frame, substantially as described.

17. A planter, comprising a wheel-frame having a portion extending forward of the wheel-spindles, a tongue having a rearward extension pivotally connected with the forward portion of the wheel-frame, a seeding-frame connected with said tongue and with the forward portion of the wheel-frame, seeding devices carried by said seeding-frame, and means for raising said frame to an inoperative position, substantially as described.

18. A planter, comprising a wheel-frame having a portion extending forward of the wheel-spindles, a tongue pivotally connected with the forward portion of the wheel-frame, a seeding-frame pivotally connected at its forward end with the tongue and movable vertically independently thereof, means connecting said seeding-frame with the forward portion of the wheel-frame, and seeding devices carried by said seeding-frame, substantially as described.

19. A planter, comprising a wheel-frame, seeding devices, a tongue connected with the wheel-frame, a sweep-standard, a sweep carried thereby, a brace connected with the tongue and pivotally supporting said standard, a bolt connected with the upper portion of said standard and with said tongue, a plate secured to said tongue and having a lip which receives said bolt, and means adjustably connecting said bolt with said lip, substantially as described.

20. A planter, comprising a wheel-frame, a tongue pivotally connected therewith, a lifting-lever mounted on said wheel-frame and connected with said tongue, a seeding-frame connected with said wheel-frame, seeding devices carried by said seeding-frame, draft mechanism, and means connecting said seeding-frame with the draft devices, substantially as described.

21. A planter, comprising a wheel-frame, a tongue pivotally connected therewith, a seeding-frame having an independent vertical movement, seeding devices carried thereby, a belt for driving said seeding devices from said wheel-frame, and a tension device for said belt, substantially as described.

WILLIAM L. PAUL.

Witnesses:
WESLEY A. PAUL,
WM. R. BOND.